United States Patent
Zoetelief et al.

(10) Patent No.: US 11,834,590 B2
(45) Date of Patent: Dec. 5, 2023

(54) ADHESIVE COMPOSITIONS AND THEIR USE IN 3D PRINTING

(71) Applicant: Covestro (Netherlands) B.V., Nieuwegein (NL)

(72) Inventors: Wilhelmus Frederikus Zoetelief, Echt (NL); Patrick Gerardus Duis, Echt (NL); Adrianus Antonius Johannes Van Geel, Echt (NL); Danielle Glasbergen-Benning, Echt (NL); Rudolfus Antonius Theodorus Maria Van Benthem, Echt (NL); Robbert Van Sluijs, Echt (NL)

(73) Assignee: STRATASYS, INC., Eden Prairie, MN (US)

( * ) Notice: Subject to any disclaimer, the term of this patent is extended or adjusted under 35 U.S.C. 154(b) by 386 days.

(21) Appl. No.: 16/955,104

(22) PCT Filed: Dec. 21, 2018

(86) PCT No.: PCT/NL2018/050877
§ 371 (c)(1),
(2) Date: Jun. 18, 2020

(87) PCT Pub. No.: WO2019/125170
PCT Pub. Date: Jun. 27, 2019

(65) Prior Publication Data
US 2020/0377769 A1      Dec. 3, 2020

Related U.S. Application Data (60) Provisional application No. 62/609,354, filed on Dec. 22, 2017.

(51) Int. Cl.
*C09J 133/08* (2006.01)
*B33Y 70/00* (2020.01)
(Continued)

(52) U.S. Cl.
CPC .......... *C09J 133/08* (2013.01); *B29C 64/106* (2017.08); *B33Y 70/00* (2014.12); *C08F 220/18* (2013.01);
(Continued)

(58) Field of Classification Search
CPC ................ C08F 220/06; C08F 220/18; C08F 220/1802; C08F 220/1804; C09J 7/10;
(Continued)

(56) References Cited

U.S. PATENT DOCUMENTS 3,238,168 A * 3/1966 Wolff ................. C09D 133/064
526/318
3,484,338 A * 12/1969 Britton ................... C09J 157/04
525/122

(Continued)

FOREIGN PATENT DOCUMENTS

CN    106795230 B    6/2020
DE    19724915 A1 * 12/1998    ............ C08F 265/06
(Continued)

OTHER PUBLICATIONS

International Search Report dated Mar. 26, 2019.
Written Opinion dated Jun. 27, 2019.

*Primary Examiner* — Sophie Hon
(74) *Attorney, Agent, or Firm* — Faegre Drinker Biddle & Reath LLP (57) ABSTRACT

Adhesive compositions comprising an aqueous dispersion of an acrylic polymer are disclosed, with such compositions having particular applicability in additive manufacturing processes, such as three-dimensional (3D) printing, including Fused Filament Fabrication (FFF). In particular, the compositions address drawbacks associated with an improper degree of adhesion between a thermoplastic build material and build plate, which decrease the quality of printed objects. In representative aqueous dispersions, the (Continued)

solids content of at least about 5 wt. % and also most about 95 wt. % of the acrylic polymer is solubilized, with the balance of this polymer comprising dispersed solid particles.

20 Claims, 3 Drawing Sheets (51) Int. Cl.
  *B29C 64/106* (2017.01)
  *C09J 7/10* (2018.01)
  *C09J 133/02* (2006.01)
  *C09J 133/10* (2006.01)
  *C08F 220/18* (2006.01)
  *B33Y 10/00* (2015.01)
  *B33Y 40/00* (2020.01)
(52) U.S. Cl.
  CPC ........... *C08F 220/1804* (2020.02); *C09J 7/10* (2018.01); *C09J 133/02* (2013.01); *C09J 133/10* (2013.01); *B33Y 10/00* (2014.12); *B33Y 40/00* (2014.12); *C08F 220/1802* (2020.02)

(58) Field of Classification Search
  CPC ...... C09J 133/02; C09J 133/08; C09J 133/10; B29C 64/106
  See application file for complete search history.

(56) References Cited

U.S. PATENT DOCUMENTS

| 2013/0344019 | A1  | 12/2013 | Weber |
| 2015/0232594 | A1* | 8/2015  | Van Geel ............. C08F 220/06 526/318.44 |
| 2017/0291965 | A1  | 10/2017 | Schmidt et al. |
| 2019/0092978 | A1  | 3/2019  | Ogino et al. |
| 2019/0119424 | A1* | 4/2019  | Sommer ................ C08K 5/09 |

FOREIGN PATENT DOCUMENTS

| ES | 2500047 T3 * | 9/2014 | ........... C08F 220/18 |
| JP | 2005042061 A | 2/2005 | |
| JP | 2016135589 A | 7/2016 | |
| WO | WO-2017162641 A1 * | 9/2017 | ................ C08F 2/24 |
| WO | WO2017162641 A1 | 9/2017 | |
| WO | WO2017180961 A1 | 10/2017 | |

* cited by examiner

ADHESIVE COMPOSITIONS AND THEIR USE IN 3D PRINTING

CROSS-REFERENCE TO RELATED APPLICATIONS

This application is a U.S. national phase entry under 35 USC § 371 of international application PCT/NL2018/050877, filed 21 Dec. 2018, which designated the U.S. and claims priority to U.S. Provisional Application 62/609,354, filed 22 Dec. 2017, the entire contents of each of which is hereby incorporated by reference in its entirety.

TECHNICAL FIELD

Aspects of the invention relate to dispersions of acrylic polymers, such as acrylic emulsion polymers, wherein the polymers are present in a continuous aqueous phase, at least partially in the form of solid particles and at least partially solubilized. Further aspects relate to the use of such dispersions to improve adhesion between a three-dimensional (3D) object and a build plate, during 3D printing.

BACKGROUND

Three-dimensional (3D) objects can be formed by additive and subtractive manufacturing processes. Additive manufacturing can refer to a 3D printing process in which a string or filament of a meltable or flowable "build material," such as a thermoplastic polymer, is heated to its molten or otherwise flowable state (e.g., above the glass transition temperature ($T_g$) of the polymer) and extruded in this state by a print head or dispenser. The print head has the capability to carefully move and position the molten polymer, at first onto a build plate as an initial layer and subsequently onto this initial layer and further layers, as needed to form the particular 3D object. The build plate can also be referred to as a "print bed," "print pad," "printing platform," or even generically as a "build surface." During 3D printing, the print head moves relative to the build plate in the x-, y-, and z-dimensions, i.e., along axes directed in these dimensions, with the print head often being programmed to move along the x- and y-axes, and with the build plate being moved along the z-axis to allow the object to be built up, layer by layer. The motions of the print head and build plate are typically computer driven, using computer-aided design (CAD) or computer-aided manufacturing (CAM) software that generate drive signals to coordinate these controlled movements of the print head and build plate. Additive manufacturing in this manner is known as Fused Filament Fabrication (FFF) or Fused Deposition Modelling (FDM), which is generally disclosed in references such as U.S. Pat. Nos. 4,749,347 and 5,121,329.

The quality of any 3D object made by FFF depends significantly on the proper level of adhesion between the continually dispensed/continually cooling build material and the build plate. If initial layer(s) of build material do not adhere sufficiently, the 3D object being generated may shift, warp, or delaminate from the build plate, resulting in poor quality or even a failure to produce the desired, finished object. If the object is not firmly fixed to the build plate during printing, even slight displacement forces, causing movement between the two, can severely compromise dimensional accuracy or part performance.

Build plates, which provide the surfaces onto which the molten or flowable polymer is dispensed, are typically made of a rigid, durable material such as metal (e.g., aluminum), acrylic (e.g., plexiglass), glass, or even carbon fiber. In many applications, however, such materials are not ideally suited to provide reliable surfaces on which the 3D printed objects can adhere solidly and consistently, in part because of a high surface finish and/or low porosity which facilitates ultimate part removal and cleaning. For this reason, it is often desirable to cover and/or pretreat the build plate, prior to 3D printing, in order to improve the likelihood that the object will adhere adequately to the build plate for the duration of the print. For example, manufactures of 3D printers using FFF often recommend covering the build plate with a heat resistant polyimide film such as Kapton® tape, or otherwise paper masking tape such as painter's tape. Pretreating with glues or other liquid adhesives may also be specified as a way to better hold the 3D printed object to the surface under printing conditions. In addition to improving thermoplastic polymer/build plate bonding, such covering materials can provide a removable and replaceable surface on which to print, and in some cases even protect the build plate from undergoing physical wear and tear, thereby increasing its longevity.

Despite the prevalence of such adhesives, films, and tapes, certain polymeric build materials remain particularly difficult to process via 3D printing methods such as FFF because they less readily achieve and maintain adhesion to the build surface during the course of the part build using such known methods. In particular, semi-crystalline polymers with elevated $T_g$ values such as polyamides, polypropylenes, etc. are notoriously difficult to process due to delamination or displacement from the build surface. Known adhesive materials, such as Dimafix®, do not offer sufficient adhesion to many such semi-crystalline build materials.

Undesirable warping and/or cracking of a 3D printed object can occur, particularly for certain types of thermoplastic build materials, as a result of cooling too quickly. For this reason, a heated build plate or build chamber may be used to counteract such effects. For example, the surface of a build plate may be preheated to, and maintained during printing at, a specified temperature that is typically within the range of 60° C.-130° C. and depends on the specific thermoplastic composition and its cooling characteristics. This heating presents another variable that affects the bonding between the build plate and printed object and consequently the overall performance of a given FFF given application. Materials with a higher $T_g$, including the aforementioned semi-crystalline polymers, however, require that the build pad and/or chamber be maintained at a temperature higher than the operable window for many known adhesives. One known class of adhesive compositions (including Printafix®) is capable of bonding to semi-crystalline materials, but is operable only at temperatures far below those which are required to process such build materials in FFF methods.

Either insufficient or excessive adhesion between the object and build plate may be problematic. For example, whereas a weak bond can cause the extruded thermoplastic to separate from the build plate prematurely, leading to imperfections or a failed print process altogether, a strong bond can cause difficulties with respect to removing the finished 3D object following completion of the printing. In some cases, this can require the use of a hand tool such as a scraper to separate the printed 3D object from the build plate, potentially resulting in damage to either or both. In addition, reusability of build plates is generally a desired property, which requires removal of all of the extruded print material from a previous job or process prior to beginning a the next. In some cases, such removal can be not only tedious and time consuming, but may also cause damage the build plate itself.

In view of these multiple considerations, ways of achieving the proper level of adhesion between the thermoplastic build material, especially semi-crystalline polymeric build materials with higher glass transition temperatures, and the build plate used in additive manufacturing are continually being sought. Further, improvements to known adhesion solutions are desired which simultaneously offer sufficient adhesion to high $T_g$, high-performance build materials such as semi-crystalline polymers, maintain that adhesion at the required elevated temperatures utilized in FFF build processes, and facilitate part removal upon process completion and part cooling.

Challenges to achieving a satisfactory solution reside in a number of factors encountered in such processes that impact adhesion, such as build plate type, thermoplastic build material type, and operating conditions, including build plate temperature.

BRIEF SUMMARY

Aspects of the invention are associated with the discovery of adhesive compositions comprising an aqueous dispersion of an acrylic polymer, with such compositions having particular applicability for use in additive manufacturing processes (e.g., three-dimensional (3D) printing). The compositions may advantageously address one or more drawbacks associated with an improper degree of adhesion between a thermoplastic build material and build plate, such as those described above. Importantly, such adhesive compositions can provide a relatively high level of adhesion during 3D printing (e.g., using Fused Filament Fabrication (FFF)) with the build plate being maintained at an elevated temperature. In this way the adhesive compositions described and claimed herein are tuned to function in the rigorous printing conditions that are needed for optimal for part performance, thereby obviating the need to adjust the printing conditions to the sensitivities of the adhesive itself.

The adhesive compositions described and claimed herein ensure strong adherence of the initial layer of dispensed thermoplastic, preserving fidelity to the desired shape of the object, for example as dictated by a CAD or CAM file read by the processor of a 3D printer, in addition to low or even undetectable levels of warpage in the finished objects. Moreover, such adhesive compositions can provide a relatively low level of adhesion following cooling of the build plate, for example to ambient temperature such as about 20° C., upon completion of the printing process. This, in turn, allows the 3D printed objects to become easily removable (e.g., self-detachable or easily detachable by the application of normal manual force) following a printing application and after cooldown of the build surface.

Adhesive compositions as described herein are particularly well-suited for 3D printing, at least partly due to the increasing tackiness or stickiness, exhibited at temperatures near and also above the glass transition temperature of the acrylic polymer(s), i.e., temperatures corresponding to those at which a build plate (or build plate surface onto which the build material is dispensed) may be maintained during the printing. Yet further important advantages reside in the adhesion characteristics, as described above, being retained over long print times (e.g., greater than about 1 hour, or even greater than about 3 hours), and/or in compatibility with certain semi-crystalline polymers. In addition, adhesive compositions described herein are easily applied to the build plate used in additive manufacturing, for example with a brush or sponge. Because such compositions are waterborne dispersions, this facilitates their use in terms of safety and disposal requirements.

Particular embodiments of the invention relate to an adhesive composition comprising an aqueous dispersion of an acrylic polymer, in which the aqueous dispersion has a solids content of at least about 5 wt. % and also in which at most about 95 wt. % of the acrylic polymer is solubilized, with the balance of this polymer comprising dispersed solid particles. Other embodiments relate to such an adhesive composition, in which the acrylic polymer is an emulsion copolymer formed as the reaction product of at least butylmethacrylate, ethylacrylate, and methacrylic acid and the composition is in the form of an emulsion having a continuous phase aqueous phase. Solid particles of the copolymer are dispersed in this phase, and also at most about 95 wt. % of the copolymer is solubilized in this phase. In such embodiments, the continuous aqueous phase may be alkaline, such as having a pH of at least about 7.5.

Other embodiments relate to a method for forming a 3D object, for example using an additive manufacturing process such as 3D printing using FFF, as described herein. The method comprises dispensing at least an initial layer of thermoplastic build material, in a flowable state, onto a build plate having an adhesive composition, as described herein, applied to the surface of the plate onto which the thermoplastic build material is dispensed. According to particularly advantageous embodiments, the methods may be further characterized by any one or more, and optionally all, of the following: (i) the thermoplastic build material is a polyamide, such as a polyphthalamide; (ii) the build plate, or its surface onto which the thermoplastic build plate is dispensed, is maintained at or above the glass transition temperature ($T_g$) of the acrylic polymer during the dispensing; and/or (iii) the build plate comprises, consists essentially of, or consists of, glass.

Advantageously, according to a preferred method, the use of the adhesive composition as described herein reduces displacement or warpage of the thermoplastic build material. A reduction in displacement can be determined according to a standard displacement test, as described below, relative to a comparative or baseline test performed with all conditions being the same as in the standard displacement test, except without the application of the adhesive composition. In particular embodiments, the standard displacement test may cause a displacement of the thermoplastic build material or 3D object that is below a threshold value (e.g., 0.2 mm or 0.4 mm), whereas the baseline displacement caused by the baseline test may be above the threshold value.

Yet further embodiments relate to an apparatus for additive manufacturing, such as a 3D printer and associated processor for controlling movement of the print head and/or build plate as described herein (e.g., according to instructions in a CAD or CAM file), wherein the apparatus is packaged together with instructions for applying an adhesive composition as described herein, onto a build plate of the apparatus. The instructions may further describe any one, some, or all of the forming conditions for additive manufacturing, which may also correspond to conditions of a standard displacement test, as noted below. A particular apparatus may be further packaged together with an adhesive composition as described herein, for example with the adhesive composition in a separate container.

These and other embodiments, aspects, and advantages relating to the present invention are apparent from the following Detailed Description.

BRIEF DESCRIPTION OF THE DRAWINGS

A more complete understanding of the exemplary embodiments of the present invention and the advantages thereof may be acquired by referring to the following description in consideration of the accompanying figures. The same reference numbers are used throughout the figures to depict the same or similar features. In order to facilitate explanation and understanding, the figures provide simplified schematic illustrations, with the understanding that the elements shown are not necessarily drawn to scale.

DETAILED DESCRIPTION

The expression "wt. %" refers to percentage by weight, and the expression "wt.-ppm" refers to parts per million by weight.

Aspects of the invention are associated with the discovery of adhesive compositions having important and advantageous properties, particularly in their application to additive manufacturing processes, such as three-dimensional (3D) printing using Fused Filament Fabrication (FFF), as described above, which may otherwise be referred to as Fused Deposition Modelling (FDM). In such processes, the application of such adhesive compositions can improve performance, particularly in terms of securely affixing an initial layer of thermoplastic build material onto a build plate. The build plate may be heated during the dispensing of this initial layer, as well as subsequent layers being adhered to this initial layer in the formation of the 3D object.

Adhesive Compositions

Representative adhesive compositions comprise an aqueous dispersion of an acrylic polymer. In an embodiment, the polymer is an acrylic emulsion. A significant fraction, but not all, of the polymer is solubilized, for example, in a continuous aqueous phase of the dispersion or composition. According to particular embodiments, generally at most about 95 wt. % (e.g., from about 40 wt. % to about 95 wt. %), typically at most about 85 wt. % (e.g., from about 50 wt. % to about 85 wt. %), and often at most about 80 wt. % (e.g., from about 55 wt. % to about 80 wt. %), of the acrylic polymer is solubilized in the dispersion or composition. The balance of the acrylic polymer may comprise dispersed solid particles. Representative particle sizes (diameters), or average particles sizes in a given dispersion or composition, are generally from about 50 nanometers (nm) to about 500 nm, and more typically from about 80 nm to about 150 nm. To the extent that particles of non-solubilized acrylic polymer may constitute a discontinuous organic phase, the dispersions and compositions may be considered as being in the form of an emulsion, with the aqueous phase being the continuous phase. In particular embodiments, the solids content of the composition or aqueous dispersion may be generally at least about 3 wt. % (e.g., from about 3 wt. % to about 50 wt. %), typically at least about 5 wt. % (e.g., from about 5 wt. % to about 35 wt. %), and often at least about 10 wt. % (e.g., from about 10 wt. % to about 20 wt. %).

The solids content may be determined according to a simple analytical procedure whereby a known weight of the composition or aqueous dispersion is heated to evaporate all of the solvent or continuous phase, such as by heating a 1-gram sample at 105° C. for 1 hour and then at 150° C. for an additional hour. The remaining sample weight after this heating period is then divided by the known, initial sample weight to determine the wt. % solids.

The weight percentage of solubilized acrylic polymer in the dispersion or composition may be determined by subjecting a sample, after determining its solids content as described above (or otherwise foregoing this determination if the solids content is already known) to centrifugation to separate the particles of polymer from the supernatant or aqueous phase. According to a specific analytical procedure, the sample with a determined (or known) solids content is centrifuged for 24 hours at 25 000 rpm in an ultracentrifuge Sigma 3-30K with a 12158-H rotor and 6×20 ml vials, corresponding to a force of 50 000 g. The supernatant is then separated as a top layer and heated, such as described above with respect to the determination of the solids content, to evaporate all of the solvent. The weight of solids in the supernatant is then divided by the total weight of solids in the initial sample, calculated based on its determined (or known) solids content, to determine the wt. % solubilized acrylic polymer.

Representative acrylic polymers are emulsion copolymers of (i) at least one $C_1$-$C_{16}$ alkyl methacrylate, (ii) at least one $C_1$-$C_{16}$ alkyl acrylate, and (iii) at least one unsaturated carboxylic acid. The term "$C_1$-$C_{16}$ alkyl" in reference to a $C_1$-$C_{16}$ alkyl methacrylate or a $C_1$-$C_{16}$ alkyl acrylate refers to a compound formed by esterification of base methacrylate or acrylate with a $C_1$-$C_{16}$ alkyl radical, with this radical being understood as corresponding to (e.g., derived from) an alkane hydrocarbon having from 1 to 16 carbon atoms and also having a site of bonding between one of its carbon atoms, due to a radical formation by removal of a hydrogen atom, with the oxygen atom of the base methacrylate or acrylate. Representative $C_1$-$C_{16}$ alkyl radicals include methyl, ethyl, n-propyl, iso-propyl, n-butyl, iso-butyl, tert-butyl, etc. The $C_1$-$C_{16}$ alkyl radical may be straight chain (normal), branched (iso), or cyclic (cyclo), with straight chain and branched radicals being preferred. Exemplary $C_1$-$C_{16}$ alkyl methacrylates include methyl methacrylate, ethyl methacrylate, propyl methacrylate, and n-butyl methacrylate. Exemplary $C_1$-$C_{16}$ alkyl acrylates include ethyl acrylate and tert-butyl acrylate.

In the case of a $C_1$-$C_{16}$ alkyl methacrylate, the $C_1$-$C_{16}$ alkyl radical may optionally be substituted with amino, meaning that (i) a terminal monovalent methyl (—$CH_3$) group of the $C_1$-$C_{16}$ alkyl radical may be amino-substituted to form a terminal monovalent aminomethyl (—$CH_2NH_2$) group or (ii) an intermediate divalent alkylene group (—$CH_2$) of the $C_1$-$C_{16}$ alkyl radical may be replaced with an intermediate divalent amino group (—NH—). For example, in the case of (ii), exemplary amino-substituted $C_1$-$C_{16}$ alkyl methacrylates include dimethylaminoethyl methacrylate, and tert-butylaminoethyl methacrylate.

The term "unsaturated carboxylic acid" refers to compounds having at least one terminal carboxylic acid group (—COOH) and at least one carbon-carbon double bond (C═C), providing a site of unsaturation. Representative unsaturated carboxylic acids include acrylic acid, methacrylic acid, 2-carboxy ethyl acrylate, crotonic acid, and itaconic acid.

A preferred acrylic emulsion polymer is a copolymer of (i) n-butyl methacrylate (BMA), (ii) ethylacrylate (EA), and (iii) methacrylic acid (MAA). In such a copolymer, or in a copolymer, more generally, of (i) at least one $C_1$-$C_{16}$ alkyl methacrylate, (ii) at least one $C_1$-$C_{16}$ alkyl acrylate, and (iii) at least one unsaturated carboxylic acid, the monomers (i), (ii), or, more precisely the residues of the these monomers following their copolymerization, may be present in the acrylic emulsion polymer in weight ratios of about 60 to about 80 parts by weight of (i): about 5 to about 15 parts by weight of (ii): and about 10 to about 30 parts by weight of (iii).

Formation of Acrylic Polymers

Acrylic polymers may be formed by aqueous emulsion polymerization of a mixture of monomers (i), (ii), and present in the mixture in weight ratios as described above. In more particular embodiments, these weight ratios may be about 65 to about 75 parts by weight of (i): about 8 to about 12 parts by weight of (ii): and about 15 to about 25 parts by weight of Even more particularly these weight ratios may be about 67 to about 72 parts by weight of (i): about 9 to about 11 parts by weight of (ii): and about 18 to about 23 parts by weight of (iii). The mixture that is subject to emulsion polymerization, according to one method for forming an acrylic polymer as described herein, may comprise, consist of, or consist essentially of, monomers described herein (e.g., at weight ratios as described herein). In the case of a mixture that "consists essentially of" such monomers, this does not preclude the presence of minor amounts of impurities (e.g., present in the mixture in a combined amount of less than about 5 wt. % or possibly less than about 3 wt. %), which may, for example, be introduced via raw materials used in the emulsion polymerization reaction mixture.

The method of free-radically initiated aqueous emulsion polymerization is described, for example, in ENCYCLOPEDIA OF POLYMER SCIENCE AND ENGINEERING, Vol. 8: 659-677 (1987) John Wiley & Sons, Inc.; D. C. Blackley, EMULSION POLYMERIZATION, pp. 155-465 (1975) Applied Science Publishers, Ltd., Essex; D. C. Blackley, POLYMER LATTICES, $2^{nd}$ Ed., Vol. 1: 33-415 (1997) Chapman & Hall; H. Warson, THE APPLICATIONS OF SYNTHETIC RESIN EMULSIONS, pp 49-244 (1972) Ernest Benn, Ltd., London; D. Diederich, CHEMIE IN UNSERER ZEIT [Chemistry of our Time], Vol. 24: 135-142 (1990) Verlag Chemie, Weinheim; J. Piirma, EMULSION POLYMERIZATION, pp 1-287 (1982) Academic Press; F. Holscher, DISPERSIONEN SYNTHETISCHER HOCHPOLYMERER [Dispersions of Synthetic High Polymers], pp. 1-160 (1969) Springer-Verlag, Berlin; and DE-A-40 03422. The free-radically initiated aqueous emulsion polymerization is usually carried out by dispersely distributing the monomers, typically with the co-use of dispersants, in the aqueous medium, and polymerizing the resulting polymerization reaction system using at least one free-radical polymerization initiator.

Suitable free-radical polymerization initiators for carrying out free-radical aqueous emulsion polymerization have the capability to trigger this reaction, with representative initiators being either peroxides or azo compounds. Redox initiator systems are also suitable. Peroxides that may be used include inorganic peroxides, such as hydrogen peroxide or peroxyclisulfates; the mono- or di-alkali metal, or ammonium, salts of peroxide disulfuric acid, for example, its mono-sodium, di-sodium, potassium, or ammonium salts; organic peroxides, such as alkyl hydroperoxides, for example tert-butyl, p-menthane, or cumyl hydroperoxide; tert-butyl peroxypivalate; and dialkyl or diaryl peroxides, such as di-tert-butyl or di-cumyl peroxide, 2,5-dimethyl-2, 5-di(t)butyl-peroxy(hexane), or dibenzoyl peroxide. Representative azo compounds for use as free-radical initiators include 2,2'-azo-bis(isobutyronitrile), 2,2'-azo-bis(2,4-dimethylvaleronitrile) and 2,2'-azo-bis(amidinopropyl)di hydrochloride (AIBA, corresponding to V-50™ from Wako Chemicals), 1,1'-azo-bis(1-cyclohexanecarbonitrile), 2,2'-azo-bis(2-amidinopropane) salts, 4,4'-azo-bis(4-cyanovaleric acid), or 2-(carbamoylazo)isobutyronitrile.

In the case of redox initiator systems, suitable oxidizing agents include essentially all of the peroxides described above. Corresponding reducing agents that may be used include sulfur compounds having a low oxidation state, such as alkali metal sulfites, for example potassium and/or sodium sulfite; alkali metal hydrogensulfites, for example potassium and/or sodium hydrogen sulfite; alkali metal metabisulfites, for example potassium and/or sodium metabisulfite; formaldehyde sulfoxylates, for example potassium and/or sodium formaldehyde sulfoxylate; alkali metal salts, such as potassium and/or sodium salts, of aliphatic sulfinic acids (e.g., Bruggolite® FF6); and alkali metal hydrogen sulfides, for example potassium and/or sodium hydrogen sulfide; salts of polyvalent metals, such as iron(II) sulfate, iron(II) ammonium sulfate, and/or iron(II) phosphate; enediols, such as dihydroxymaleic acid, benzoin, and/or (i-) ascorbic acid; and reducing saccharides, such as sorbose, glucose, fructose and/or dihydroxyacetone.

The initiators are typically used in amounts of up to about 10 wt. %, and more often from about 0.02 wt. % to about to 5 wt. %, based on the combined weight of monomers that are co-polymerized.

In representative aqueous emulsion polymerization methods, surfactants may also be utilized in the polymerization reaction system, in order to assist in the dispersion of the formed polymer in water. Suitable surfactants include but are not limited to conventional anionic and/or non-ionic surfactants and mixtures thereof, such as Na, K, and $NH_4$ salts of dialkylsulfosuccinates; Na, K, and $NH_4$ salts of sulfated oils; Na, K and $NH_4$ salts of alkyl sulfonic acids; Na, K and $NH_4$ alkyl sulfates; alkali metal salts of sulfonic acids; fatty alcohols, ethoxylated fatty acids, and/or fatty amides; and Na, K, and $NH_4$ salts of fatty acids, such as Na stearate and Na oleate. Other anionic surfactants include alkyl or (alk)aryl groups linked to sulfonic acid groups, sulfuric acid half ester groups (linked in turn to polyglycol ether groups), phosphonic acid groups, phosphoric acid analogues, and phosphates or carboxylic acid groups. Non-ionic surfactants include polyglycol ether compounds and preferably polyethylene oxide compounds, for example as disclosed in "Non-Ionic Surfactants—Physical Chemistry," edited by M. J. Schick, M. Decker 1987. The amount of surfactant used is generally from about 0 wt. % to about 15 wt. %, typically from about 0 wt. % to about 8 wt. %, and often from about 0 wt. % to about 5% wt. % (e.g., from about 0.1 wt. % to about 3 wt. % or from about 0.3 wt. % to about 2 wt. %), based on the combined weight of monomers that are co-polymerized.

The polymerization reaction system may also include a chain transfer agent, which may be added to control polymer molecular weight. Suitable chain transfer agents include mercaptans (thiols) such as n-dodecylmercaptan, n-octylmercaptan, t-dodecylmercaptan, mercaptoethanol, and iso-octyl thioglycolate; and $C_2$-$C_8$ mercapto carboxylic acids and esters thereof, such as 3-mercaptopropionic acid and 2-mercaptopropionic acid. Mixtures of two or more of such chain transfer agents (regulators) may also be used. Generally, from about 0.05 wt. % to about 5 wt. %, typically from about 0.1 wt. % to 3 about wt. %, and often from about 0.1 wt. % to about 1 wt. %, of chain transfer agent is used, based on the combined weight of monomers that are co-polymerized. The above mercaptans (alkanethiols), if used, are usually added to the polymerization reaction system, together with the monomers. Also, in the case of alkanethiols being used, a subsequent hydrogen peroxide treatment may be desired in order to obtain polymers with a neutral odor.

The emulsion polymerization is normally carried out in an inert, substantially oxygen-free environment, for example in a nitrogen or argon atmosphere. Polymerization temperatures are generally from about 20° C. to about 200° C., typically from about 50° C. to about 130° C., and often from about 70° C. to about 95° C. The polymerization can be carried out batch-wise, semi-continuously, or continuously (i.e., with the semi-continuous or continuous addition of monomer reactants, and semi-continuous or continuous withdrawal of polymer product). The polymerization initiator, the monomers, and the regulator(s) are often added semi-continuously. Preferably, at least some of the polymerization initiator, monomers, and regulator(s) are metered into the reaction vessel uniformly throughout the polymerization. However, it is also possible to have an initial charge of the monomers and the initiator in the reactor and to polymerize them, with cooling if appropriate. Another option is to carry out the polymerization using seed latex prepared from the polymers to be polymerized in the first polymerization phase. The remainder of the monomer mixture is then added.

The polymerization reaction advantageously takes place until the monomer conversion to polymer is >95% by weight, preferably >98% by weight, or even >99% by weight.

It is often useful if the aqueous polymer dispersion obtained is subjected to an after-polymerization step, in order to reduce further the amount of unreacted monomer. This step is described, for example, in EP-B-0 003 957, EP-B-0 028 348, EP-B-0 563 726, EP-A-0 764 699, EP-A-0 767 180, DE-A-3 718 520, DE-A-3 834 734, DE-A-4 232 194, DE-A-19 529 599, DE-A-19 741 187, DE-A-19 839 199, DE-A-19 840 586, WO-A-95/33775, and U.S. Pat. No. 4,529,753. It is also possible to subject the aqueous polymer dispersion obtained to stripping with an inert gas and/or steam, prior to or following an after-polymerization step. Such stripping is preferably performed following the after-polymerization step. As is described in EP-A-0 805 169, partial neutralization of the dispersion to a pH in the range from 5 to 7, preferably to a pH in the range from 5.5 to 6.5, is advantageous before a physical deodorization step.

If, however, the content of unreacted monomer after preparation is sufficiently low, these possible additional steps can be omitted, and the dispersions can be further used as prepared, providing an economical advantage.

In a preferred embodiment, the aqueous polymer dispersion obtained is subjected to a post initiation (post treatment) using tert-butyl hydroperoxide with iso-ascorbic acid or tert-butyl hydroperoxide with aliphatic sulfinic acids (e.g., Bruggolite® FF6) in water. This post treatment reduces possible discoloration of the emulsion polymer as prepared or when dissolved in the end formulation.

In the aqueous dispersion of acrylic polymer, obtained from emulsion polymerization and preferably including an after-polymerization step and/or post initiation as described above, the solids content may be adjusted, if desirable, by addition or removal of water. A preservative such as a broad-spectrum bactericide (e.g., methylisothiazolinone, CAS 2682-20-4) may be added in order to enhance the shelf life, with representative concentrations of added preservative being about 50 wt.-ppm or less, such as from about 1 wt.-ppm to about 50 wt.-ppm or from about 30 wt.-ppm to about 50 wt.-ppm, with about 50 wt.-ppm being preferable in the case of methylisothiazolinone. A methylisothiazolinone formulation in water (9.5 wt. %) is commercially available as NEOLONE™ 950 (The Dow Chemical Company).

The acrylic polymer may be partially or completely neutralized by the addition of an alkali metal hydroxide or preferably an amine, optionally with the intermittent or continuous monitoring of pH. Representative alkali metal hydroxides for neutralization include sodium hydroxide, potassium hydroxide, and ammonium hydroxide. Representative amines for neutralization include mono-, di- or trialkanolamines having 2 to 5 carbon atoms in the alkanol radical. Particular examples include mono-, di- and triethanolamine; mono-, di- and tri-n-propanolamine; mono-, di- and tri-iso-propanolamine; 2-amino-2-methyl-1-propanol and di-(2-methoxyethyl)amine. Another type of amine for neutralization is an alkanediolamine having 2 to 5 carbon atoms, with 2-amino-2-methylpropane-1,3-diol and 2-amino-2-ethylpropane-1,3-diol being representative. Yet another type of amine is a primary, secondary, or tertiary, alkylamine having 5 to 10 carbon atoms, for example N,N-diecthylpropylamine or 3-diethylamino-1-propylamine. Also suitable for neutralization are aqueous buffer solutions, such as, for example, buffers based on alkali metal or ammonium carbonate, bicarbonate, or citrate. Any of the above neutralizing agents and/or buffer solutions may be added in the form of a dilute aqueous solution to the acrylic polymer emulsion, in order to obtain a pH value as described herein.

Preparation of Adhesive Compositions and Properties of the Compositions

For purposes of preparing the adhesive compositions described herein, in order to adjust the solids content of the aqueous dispersion of acrylic polymer to a desired value, for example within a range as described above, water may be added or removed as necessary. According to some embodiments, both the solids content and the amount of solubilized acrylic polymer may be adjusted, for example within the ranges described above, by adding water and also adding a suitable a neutralizing agent as described above. Simultaneous adjustment of both the solids content and the amount of solubilized acrylic polymer may also be performed, for example, by adding an aqueous solution of a neutralizing agent (e.g., ammonium hydroxide).

According to exemplary embodiments, the solids content of the aqueous dispersion or adhesive composition may be adjusted to at least about 10 wt. % (e.g., from about 10 wt. % to about 20 wt. %), or to a value within other ranges as described above, and the weight percentage of solubilized polymer in the aqueous dispersion or adhesive composition may be adjusted to at most about 95 wt. % (e.g., from about 40 wt. % to about 95 wt. %), or to a value within other ranges as described above, by (i) adding water to dilute the solids (reduce the solids content), followed by adding an aqueous solution of a neutralizing agent to solubilize a portion of the acrylic polymer, or (ii) adding a aqueous solution of a neutralizing agent to simultaneously achieve the effects of reducing solids content and solubilizing the polymer, to the desired extents. In either procedure (i) or (ii), a representative neutralizing agent is ammonium hydroxide. However, in general, the desired weight percentage of solubilized acrylic polymer at the desired solids content is achieved when the composition is made alkaline. For example, the composition, following the addition of the neutralizing agent (e.g., ammonium hydroxide), may have a pH of at least about 7.5 (e.g., from about 7.5 to about 10.5), or at least about 8.0 (e.g., from about 8.0 to about 9.0). In this regard, the "neutralizing agent" may more accurately serve as an "alkalinizing agent" or "alkalinization agent."

Representative adhesive compositions and aqueous dispersions of acrylic polymers used in such compositions, optionally following an adjustment of solids content and/or pH as described above, have a finite quantity of acrylic polymer that is solubilized and a finite quantity that is present in the form of dispersed solid particles. The presence of the latter form may be evidenced, typically, by a visual indication of opaqueness or cloudiness.

As described above, during the formation of the acrylic polymer, a chain transfer agent or regulator may be added to control polymer molecular weight. In representative embodiments, the acrylic polymer may have a weight average molecular weight ($M_w$) generally from about 30 kilodaltons (kDa) to about 500 kDa, typically from about 75 kDa to about 200 kDa, and often from about 90 kDa to about 160 kDa. The determination of $M_w$ may be made using gel permeation chromatography (GPC).

The polymer glass transition temperature ($T_g$) depends on the polymer molecular weight and also has implications relating to the performance of an adhesive composition, comprising such polymer, in additive manufacturing processes. Of particular relevance are such processes in which the build plate, having the adhesive composition applied thereon, is heated, for example, to near or above the $T_g$, rendering the acrylic polymer sufficiently tacky or sticky to achieve one or more of the advantages described above, associated with improved adherence of the dispensed build material. These advantages include improved quality of a 3D object printed on the build plate, as well as reduced warpage, or displacement of the object from the build plate (e.g., by loss of contact between edges of the object and the build plate). A representative value of $T_g$ of the acrylic polymer is generally from about 15° C. to about 150° C., typically from about 40° C. to about 130° C., and often from about 85° C. to about 110° C. Preferably, the acrylic polymer has both an $M_w$ and a $T_g$ within ranges as described herein, for example, an $M_w$ from about 90 kDa to about 160 kDa and a $T_g$ from about 85° C. to about 110° C. The $T_g$ of the polymer refers to the limit at which, according to G. Kanig (KOLLOID-ZEITSCHRIFT & ZEITSCHRIFT FUR POLYMERE, Vol. 190, p. 1, equation 1), the polymer changes from a glassy, brittle state to a rubbery state. This temperature may be determined experimentally, using differential scanning calorimetry (DSC).

The total residual (unreacted) monomer content of the acrylic polymer in the aqueous dispersion or adhesive composition is preferably less than 500 wt.-ppm, more preferably less than 350 wt.-ppm, and most preferably less than 200 wt.-ppm. In the case of an acrylic polymer that is formed from monomers of n-butyl methacrylate (BMA), ethyl acrylate (EA), and methacrylic acid (MAA), in the aqueous dispersion or adhesive composition: (i) the total amount of residual BMA is preferably less than 300 wt.-ppm, more preferably less than 200 wt.-ppm, and most preferably less than 150 wt.-ppm; (ii) the total amount of residual ethyl acrylate (EA) is preferably less than 100 wt.-ppm, more preferably less than 50 wt.-ppm, and most preferably less than 30 wt.-ppm; and/or (iii) the total amount of residual methacrylic acid (MAA) is preferably less than 300 wt.-ppm, more preferably less than 200 wt.-ppm, and most preferably less than 150 wt.-ppm. The Brookfield (dynamic) viscosity of the aqueous dispersion or adhesive composition, measured at 25° C., is generally from about 5 to about 100 millipascal·second (mPa·s), typically from about 10 to about 90 mPa·s, and often from about 20 to about 75 mPa·s.

Use of Adhesive Compositions

Figure 1:
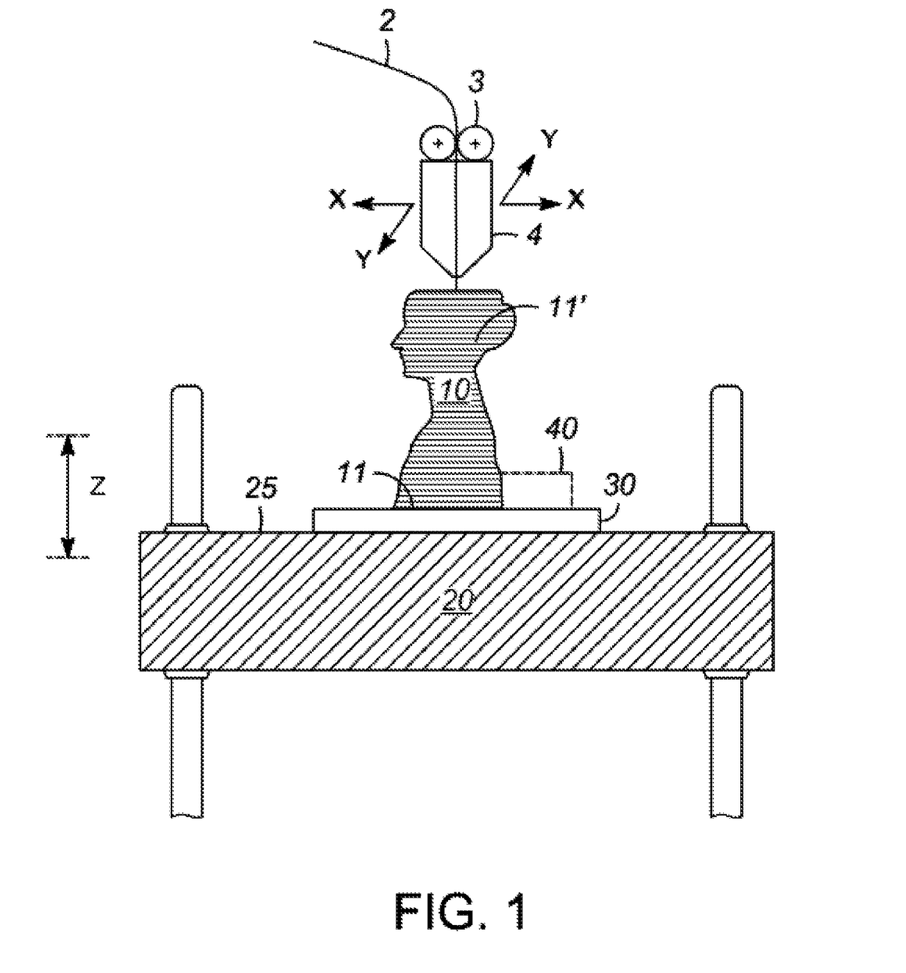
FIG. 1 depicts relevant components of a representative additive manufacturing apparatus, such as a three-dimensional (3D) printer.

As described above, the adhesive compositions may be used advantageously in additive manufacturing methods, such as 3D printing methods, and in particular in FFF (or FDM) methods for forming 3D objects. FIG. 1 depicts certain components that may be used to carry out such methods, by which a thermoplastic build material 2, for example in the form of a filament, is fed through a driving mechanism, shown as rotating rollers 3, and extruded through a heated nozzle of a print head (or extrusion head) 4. The print head 4 has the capability of heating thermoplastic filament or build material 2 to a flowable (e.g., molten) state, at which state the first or initial layer 11 is dispensed through print heat 4 onto a build plate 20 having applied thereon a layer of an adhesive composition 30 as described herein. One or more, and typically 10 or more, 50 or more, or even 100 or more, of subsequent layers 11' of thermoplastic build material 2 are likewise deposited in the flowable state, onto or above initial layer 11, such that cooling and fusion of the layers 11, 11' causes the formation of solid 3D object 10. Representative thicknesses individual layers 11, 11', used to form object 10, are from about 0.05 mm to about 2 mm, such as from about 0.1 mm to about 0.5 mm.

According to the embodiment in FIG. 1, dispensing of initial layer 11 and subsequent layers 11' through print head 4 is performed with two-dimensional (x-y) movement of print head 4, allowing precise placement of build material 2. This movement may be caused by employing the appropriate mechanical devices, such as stepper motors or servo motors, which may in turn be governed by a processor of the apparatus, having received data representative of the 3D object to be formed. The processor, for example, may include a computer-aided design (CAD) or computer-aided manufacturing (CAM) program, capable of reading the data in the form of a CAD or CAM data file that is input by a user. The processor may likewise govern downward (z) movement of build plate, as layers 11 of build material 2 are added during forming of 3D object 10.

According to a particular method, adhesive composition 30 may be applied to surface 25 of build plate 20, prior to dispensing of build material 2, and with build plate 20 at ambient temperature or nearly ambient temperature (e.g., from about 10° C. to about 30° C.). Otherwise, adhesive composition 30 may be applied with build plate 20 at an elevated temperature that is below the $T_g$ of the acrylic polymer (e.g., from about 30° C. to about 60° C.), if accelerated drying of adhesive composition onto surface 25 of build plate 20 is desired. Homogeneous and even distribution of adhesive composition 30 may be achieved by applying it with a brush, such as one suited for waterborne paints, or otherwise with a sponge or other suitable applicator. The adhesive composition 30 is allowed to dry under these ambient, nearly ambient, or elevated temperatures, and dryness may be determined by a lack of stickiness. The applied layer of adhesive composition 30 may have a thickness generally in the range from about 10 microns (μm) to about 200 μm, typically from about 20 μm to about 150 μm, and often from about 25 μm to about 75 μm. Additional coats or layers may be applied if an increase in thickness is desired.

After drying of adhesive composition 30, surface 25 of build plate 20 (namely, the surface to which this composition has been applied and onto which build material is to be dispensed) may be heated to a suitable temperature that may be near, such as within about ±15° C. of, within about ±10° C. of, or within about ±5° C. of, the $T_g$ of the acrylic polymer used in adhesive composition 30. This promotes tackiness of adhesive composition 30 for improved adherence of dispensed build material 2 and consequently improved quality of 3D object 10 being formed. Preferably, surface 25 of build plate 20 may be maintained above the $T_g$ but within these ranges (e.g., within about 15° C. above, within about 10° C. above, or within about 5° C. above) the $T_g$. The temperature of surface 25 of build plate 20 during dispensing of build material 2 can depend on the particular adhesive composition and build material for a given additive manufacturing application, as well as the type of build plate. This surface temperature is generally at least about 75° C. (e.g., from about 75° C. to about 125° C.), typically at least about 85° C. (e.g., from about 85° C. to about 115° C.), and often at least about 90° C. (e.g., from about 90° C. to about 110° C.). For other materials, the surface temperature can be higher, such as from about 130° C. to about 150° C.

Representative thermoplastic build materials comprise, consist of, or consist essentially of one or more of the following thermoplastic polymers: a polyamide (PA), a polyethylene, a polypropylene, a polyphenylene sulfide (PPS), a polyphenyl sulfone (PPSF), a high impact polystyrene ((HI)PS), polyethylene terephthalate (PET), a glycol-modified polyethylene terephthalate (PETG), a polyether imide (PEI), an acrylonitrile styrene acrylate (ASA), a polyvinyl alcohol (PVA), a polyether ether ketone (PEEK), an acrylonitrile butadiene styrene (ABS), a polylactic acid (PLA), a polycarbonate (PC), or a polybutadiene terephthalate (PBT).

Representative build plates and their respective surfaces may comprise, consist essentially of, or consist of, metal (e.g., aluminum), acrylic (e.g., plexiglass), glass, carbon fiber, or other heat resistant materials.

The temperature of surface 25 of build plate 20, as described above, may be particularly advantageous in conjunction with the dispensing of thermoplastic build materials comprising, consisting essentially of, or consisting of, a polyamide (e.g., Novamid® ID 1070, a PA6 copolymer available from DSM, or Novamid® ID 1030, PA6/66 copolyamide available from DSM), including a polyphthalamide (PPA) (such as PA4T (ACE), available from DSM) that is representative of a high-performance polyamide. The appropriate extrusion or melt temperature of such materials, exiting the heated nozzle of print head 4, is generally from about 260° C. to about 385° C., although such temperature will depend upon to the properties of the material being extruded, and be easily modified or controlled by those of ordinary skill in the art to which this invention applies. Such temperatures and/or thermoplastic build materials may further be advantageous in conjunction with a build plate 20 and/or its surface 25 being glass.

In conjunction with the use of an adhesive composition, the stability of 3D object, particularly in the case of large builds, may be further enhanced with the use of optional "brim" 40 that adheres to at least one side and extends the footprint/surface of 3D object 10, and therefore also its adhesion to surface 25. Depending on the size of 3D object 10, the height of brim 40 may be formed of from about 1 to about 10, such as from about 2 to about 5, layers of deposited build material 2, having a representative thickness as described above with respect to layers 11, 11' used to form object 10. The length of brim 40, also depending on the size of 3D object 10 and degree of additional stability desired, may be from about 2 mm to about 25 mm, such as from about 5 to about 10 mm. Whether or not brim 40 is employed, after the forming of 3D object 10, this object, build plate 20, and its surface 25 may be allowed to cool to ambient temperature or nearly ambient temperature (e.g., from about 10° C. to about 30° C.), at which temperature 3D object 10 may become easily detachable from build plate 20. To the extent that adhesive composition 30 remains on build plate 20, its removal may be easily accomplished, in the same manner as is characteristic of removing waterborne paint. For example, an alkaline solution such as ammonia or sodium hydroxide can be used to dissolve the adhesive composition, allowing it to be rinsed away easily and safely with water.

The following examples are set forth as representative of the present invention. These examples are not to be construed as limiting the scope of the invention as other equivalent embodiments will be apparent in view of the present disclosure and appended claims.

EXAMPLES

Examples 1-5

Adhesive Compositions

Adhesive compositions as described above, and useful in 3D printing methods using FFF, were formed from emulsion polymerization of various monomers, including n-butyl methacrylate (BMA), ethyl methacrylate (EMA), ethyl acrylate (EA), n-butyl acrylate (BA), and methacrylic acid (MAA). The weight percentages of these monomers in the resulting acrylic polymers and other properties of the polymers, namely their $T_g$ (measured by DSC) and $M_w$ (measured by GPC), as well as properties of the compositions, namely acid value, solids content, pH, and Brookfield (dynamic) viscosity at 25° C., are as shown in Table 1 below.

TABLE 1

Adhesives for 3D Printing

| Ex. | BMA wt. % | EMA wt. % | EA wt. % | BA wt. % | MMA wt. % | $T_g$ ° C. | $M_w$ kDa | Acid Value mg KOH/g | Solids wt. % | pH | Visc. mPa · s |
|---|---|---|---|---|---|---|---|---|---|---|---|
| #1 | 67.4 | | 9.6 | | 23.0 | 90 | 150 | 155 | 12.5 | 8.7 | 35 |
| #2 | 67.4 | | 9.6 | | 23.0 | 90 | 150 | 155 | 12.4 | 8.7 | 30 |
| #3 | 50.0 | 20.0 | 10.0 | | 20.0 | 100 | 100 | 130 | 12.5 | 9.0 | <50 |

TABLE 1-continued

Adhesives for 3D Printing

| Ex. | BMA wt. % | EMA wt. % | EA wt. % | BA wt. % | MMA wt. % | $T_g$ °C. | $M_w$ kDa | Acid Value mg KOH/g | Solids wt. % | pH | Visc. mPa·s |
|---|---|---|---|---|---|---|---|---|---|---|---|
| #4 | 33.7 |  | 9.6 | 33.7 | 23.0 | 44 | 235 | 160 | 12.6 | 8.3 | 35 |
| #5 |  |  | 9.6 | 67.4 | 23.0 | 15 | 310 | 155 | 12.6 | 8.1 | 45 |

Therefore, it can be seen that acrylic emulsion copolymers and adhesive compositions having a variety of properties were prepared. Also, in the case compositions for which the same or similar properties were specified, as in the case of Examples 1 and 2, good reproducibility was obtained.

Examples 6-37 and Comparative Examples 1-4

Displacement Tests

As described above, aspects of the invention relate to the ability of adhesive compositions as described herein to improve stability and bonding, particularly with respect to an initial layer of thermoplastic build material being dispensed onto a build plate or surface. This improvement leads to important advantages, in terms of the overall quality of 3D-printed objects, particularly in the case of semi-crystalline thermoplastic build materials such as polyamides, which do not easily adhere to build plates made of glass or other commonly used materials or require utilization of operating temperatures beyond the capacity of other known adhesives. The efficacy of adhesive compositions in this regard can be demonstrated by comparing results according a standard displacement test performed in additive manufacturing, relative to a comparative or baseline test. All variables, or forming conditions, between the standard displacement test and its corresponding baseline test may be identical or at least comparable (e.g., according to the representative forming conditions described below), with the exception of the application of adhesive composition being used in the former test and omitted in the latter test.

According to a representative displacement test, a rectangular prism (hyper rectangle) is formed in an additive manufacturing process, either directly on a build a build plate surface (baseline test) or on the same type of build plate surface, but with an intermediate layer of adhesive composition (standard displacement test). The dimensions of the rectangular prism in each case are the same. In these examples, the dimensions are 100 mm in length×10 mm in depth×10 mm in height.

Also, the same forming conditions are used to build the rectangular prism, in the standard displacement test and its corresponding baseline test. These forming conditions may correspond, for example, to conditions used in various 3D object forming methods as described herein. Representative forming conditions include: (i) thermoplastic build material, which may be any as described above, e.g., a polyamide; (ii) build plate composition, which may be any as described above, e.g., glass; (iii) build plate surface temperature, which may be any particular temperature, e.g., 95° C., within a range as described above, or temperature profile over time, during dispensing of the thermoplastic build material; (iv) extrusion temperature of the build material, exiting the print head nozzle, which may be any particular temperature within the range from about 260° C. to about 285° C., or, more generally, any particular temperature within the range from about 150° C. to about 350° C.; (v) layer thickness of the dispensed build material, which may be, for example, any particular thickness, e.g., 0.2 mm, within a range as described above, (vi) print head speed, which may be any particular speed within the range from about 10 millimeters per second (mm/s) to about 250 mm/s, (vi) ambient relative humidity, in the environment of the object (e.g., in the build chamber), which may be, for example, in the range of from about 0% to about 20% (dry conditions), from about 20% to about 40% (moderately humid conditions), from about 40% to about 65% (humid conditions), or greater than about 65% (damp conditions); (vii) ambient temperature, in the environment of the object (e.g., in the build chamber), which may be, for example, in the range from about 5° C. to about 15° C. (below room temperature), from about 15° C. to about 25° C. (room temperature), or from about 25° C. to about 35° C. (above room temperature); and/or (viii) time for cooldown of the build surface (e.g., measured immediately adjacent the object and to within a certain approach, such as 5° C. or 3° C., of such ambient temperature), which may be, for example, in the range from about 0.1 hours to about 0.3 hours (fast cooling), from about 0.3 hours to about 1 hour (moderate cooling), or from about 1 hour to about 5 hours (slow cooling).

Forming conditions of the standard displacement test include the type of adhesive composition, which may comprise any particular aqueous dispersion of an acrylic polymer as described herein, including any particular (i) type of polymer (e.g., n-butyl methacrylate/ethylacrylate/methacrylic acid copolymer), (ii) properties, including wt. % solids content, wt. % solubilized polymer, pH, $M_w$, $T_g$, and Brookfield viscosity, within ranges as described herein. Forming conditions of the standard displacement test further include the thickness of the applied layer of adhesive composition, which may be any particular thickness, e.g., 50 µm, within a range as described above. When used according to the standard displacement test, adhesive compositions described above and applied at layer thicknesses described above advantageously have the ability to reduce, or even eliminate, detrimental displacement that results from the corresponding baseline test. A comparison of these tests can therefore demonstrate the ability of compositions as described herein to improve adhesion of the thermoplastic build material for a given set of forming conditions.

As an alternative, and as opposed to omitting the application of an adhesive composition altogether, a corresponding baseline test may involve application of a conventional adhesive, such as Dimafix or 3D Lac, at the same layer thickness as used in the standard displacement test. The Comparative Examples below are therefore representative of such corresponding baseline tests.

Figure 2A:
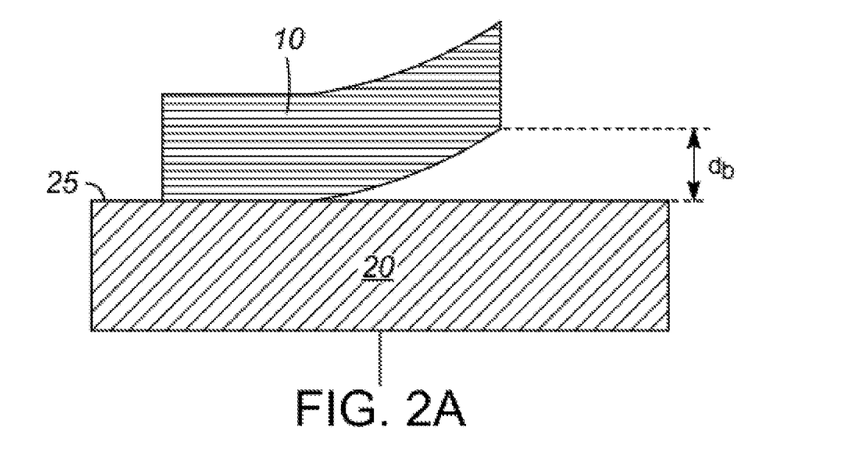
FIG. 2A depicts the baseline displacement ($d_b$) of thermoplastic build material, according to a baseline test in which a 3D object is formed, without application of adhesive composition to the build plate.
Figure 2B:
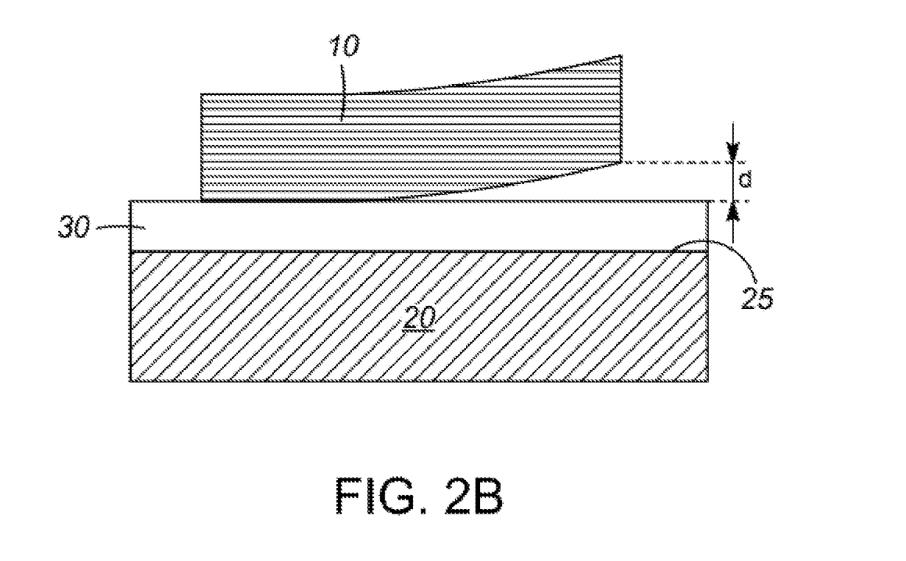
FIG. 2B depicts the displacement (d) according to a standard displacement test using the same parameters as the baseline test but including the application of adhesive composition.

Following completion of the standard displacement test and its corresponding baseline test, the corners of the formed, rectangular prism are examined for their displacement from the surface of the build plate, or, more precisely, the surface of the adhesive composition applied to the build plate, in the case of the standard displacement test. The displacement is the farthest distance of a corner from the respective surface, indicating the greatest degree of undesirable warpage. For example, FIG. 2A depicts the baseline displacement ($d_b$)) of thermoplastic build material, according to the baseline test in which 3D object 10 (in this case the rectangular prism) is formed, without application of an adhesive composition to build plate 20. As depicted in FIG. 2B, the use of adhesive composition 30, as an intermediate layer between surface 25 of build plate 20 and 3D object (again being the rectangular prism), reduces the displacement (d) in a standard displacement test using the same parameters as the baseline test, but including the application of adhesive composition 30. The displacement (d) is measured by subtracting the build height (h), which is fixed due to the computer-controlled location in the z-plane of the dispensing nozzle, from the measured thickness of the object, $h_w$.

The displacement obtained in the standard displacement test can therefore be compared to the baseline displacement obtained in the corresponding baseline test (whether performed without any adhesive or with a conventional adhesive). In this regard, particular embodiments of the invention relate to methods for forming 3D objects, under forming conditions, including any one or more, or all, of the forming conditions as described above, in which the adhesive composition reduces displacement, according to the standard displacement test performed under these conditions, compared to the baseline displacement. In further embodiments, the adhesive composition reduces displacement in the standard displacement test to below a threshold value, whereas displacement in the corresponding baseline test without the adhesive composition is above the threshold value. The threshold value of displacement may be, for example, any discreet value between 0.1 mm and 5 mm, such as 0.2 mm, 0.4 mm, 0.6 mm, or 1 mm, depending on the particular forming conditions associated with the standard displacement test. For purposes of such analysis, the adhesive composition reduces displacement compared to the baseline displacement, if any displacement (or no displacement) can be measured in the standard displacement test, but the corresponding baseline test results in a failure to form the rectangular prism due to lack of adhesion. Likewise, for purposes of such analysis, the corresponding baseline test is above any threshold value, if this test results in a failure to form the rectangular prism due to lack of adhesion.

Displacement tests are performed as described above, using inventive adhesive compositions as described herein, comprising an aqueous dispersion of an acrylic polymer that is namely a copolymer of n-butyl methacrylate, ethyl acrylate, and methacrylic acid. This polymer is formed by emulsion polymerization of a mixture of these monomers, in respective weight ratios of 70 parts:10 parts:20 parts. According to an Inventive Formulation, the solids content of the composition is 12-13 wt. %, and 70-80 wt. % of the polymer is solubilized in the continuous aqueous phase, having a pH of 8.0-9.0. Also, the $M_w$ of the polymer is 145 kDa and its $T_g$ is in the range of 98° C.-108° C. Several variants of this Inventive Formulation are prepared, as follows: Variant #1 (high solids), increased solids content of 35 wt. %, decreased solubilization of 50 wt. % (by evaporation of water); Variant #2 (low solids), decreased solids content of 3 wt. %, increased solubilization of 90 wt. % (by addition of water); Variant #3 (modified copolymer), formed by emulsion polymerization of dimethylaminoethyl methacrylate, tert-butyl acrylate, and crotonoic acid; Variant #4 (high BMA), modified monomer weight ratios in the polymerization mixture of 80 parts:5 parts:15 parts; Variant #5 (low BMA), modified monomer weight ratios in the polymerization mixture of 60 parts:15 parts:25 parts; Variant #6 (high MW), increased $M_w$ of 180 kDa (by reducing amount of chain transfer agent added during polymerization); and Variant #7 (low MW), decreased $M_w$ of 120 kDa (by increasing amount of chain transfer agent added during polymerization).

These Inventive Formulation and its Variants #1-#7 are used in displacement tests as described above, according to which coatings of these compositions at approximately 50 μm in thickness are brushed onto build plates used for 3D printing at room temperature and allowed to dry. The build plates are then heated to 90-120° C. (10° C. above the polymer $T_g$ in each case), at which point thermoplastic build material is dispensed onto the coated surface, according to a 3D printing application using FFF, to form the rectangular prism as described above. The Inventive Formulation and its Variants #1-#7, as well as a conventional adhesive for 3D printing (Dimafix), are tested for their ability to adhere thermoplastic build materials of a polyamide (Novamid® ID 1070), a polyphthalamide (PPA), a polyphenylene sulfide (PPS), and an acrylonitrile butadiene styrene (ABS), to a glass build plate. This study therefore involves a matrix of 36 separate examples, 32 of which, namely Examples 6-37, test inventive adhesive compositions as described herein, and 4 of which, namely Comparative Examples 1-4, test a conventional adhesive composition. The extrusion temperature and other parameters (e.g., print speed) specific to the thermoplastics are maintained at the appropriate levels for these build materials. A threshold maximum displacement value of 0.4 mm is designated for these tests, such that a level of displacement above this value is considered unacceptable (FAIL) as is the inability to form the rectangular prism having reference dimensions of 100 mm in length×10 mm in depth×10 mm in height. A maximum displacement value of 0.4 mm or less in these standard displacement tests is considered an acceptable degree of warpage (PASS). Results are summarized in Table 2 below:

TABLE 2

Displacement Tests, Inventive Formulation and Variants vs. Conventional Adhesive

| | Thermoplastic Build Material | | | | Displacement Test Result |
|---|---|---|---|---|---|
| Adhesive | Novamid ® ID 1070 | PPA | PPS | ABS | (≤0.4 mm?) |
| Inventive Formulation | Example 6 | | | | PASS |
| | | Example 7 | | | PASS |
| | | | Example 8 | | PASS |
| | | | | Example 9 | PASS |

TABLE 2-continued

Displacement Tests, Inventive Formulation and Variants vs. Conventional Adhesive

| Adhesive | Thermoplastic Build Material | | | | Displacement Test Result |
| --- | --- | --- | --- | --- | --- |
| | Novamid ® ID 1070 | PPA | PPS | ABS | (≤0.4 mm?) |
| Dimafix (comparative) | Comp. Ex. 1 | | | | FAIL |
| | | Comp. Ex. 2 | | | FAIL |
| | | | Comp. Ex. 3 | | FAIL |
| | | | | Comp. Ex. 4 | PASS |
| Variant #1 (high solids) | Example 10 | | | | PASS |
| | | Example 11 | | | PASS |
| | | | Example 12 | | PASS |
| | | | | Example 13 | PASS |
| Variant #2 (low solids) | Example 14 | | | | PASS |
| | | Example 15 | | | PASS |
| | | | Example 16 | | PASS |
| | | | | Example 17 | PASS |
| Variant #3 (copolymer) | Example 18 | | | | PASS |
| | | Example 19 | | | PASS |
| | | | Example 20 | | PASS |
| | | | | Example 21 | PASS |
| Variant #4 (high BMA) | Example 22 | | | | PASS |
| | | Example 23 | | | PASS |
| | | | Example 24 | | PASS |
| | | | | Example 25 | PASS |
| Variant #5 (low BMA) | Example 26 | | | | PASS |
| | | Example 27 | | | PASS |
| | | | Example 28 | | PASS |
| | | | | Example 29 | PASS |
| Variant #6 (high MW) | Example 30 | | | | PASS |
| | | Example 31 | | | PASS |
| | | | Example 32 | | PASS |
| | | | | Example 33 | PASS |
| Variant #7 (low MW) | Example 34 | | | | PASS |
| | | Example 35 | | | PASS |
| | | | Example 36 | | PASS |
| | | | | Example 37 | PASS |

As is apparent from these results, the Inventive Formulation and its Variants #1-#7, being within the scope of inventive compositions as described herein, all lead to acceptable levels warpage in standard displacement tests. This is despite the fact that these tests study the use thermoplastic build materials that are difficult to adhere, particularly on a glass build plate. Such thermoplastic build materials are in particular polyamides (PA), polyphthalamides (PPA), and a polyphenylene sulfide (PPS). In contrast, under the conditions of the displacement tests, the acrylonitrile butadiene styrene (ABS) is relatively easy to adhere and provides acceptable warpage even with the use of the conventional adhesive, Dimafix. Unlike the inventive compositions as described herein, however, Dimafix does not provide acceptable results in standard displacement tests with PA, PPA, or PPS. Therefore, under the forming conditions used in the standard displacement tests, the adhesive compositions reduce displacement of the thermoplastic build material, to below a threshold value of 0.4 mm, using a standard displacement test, according to which a baseline displacement without the adhesive composition, or otherwise with a conventional adhesive compositions, is above the threshold value. The superiority of the inventive compositions is therefore demonstrated by the above Examples 5-37 and Comparative Examples 1-4.

Examples 38-41 an Comparative Examples 5-6

Displacement/Warpage Measurements

An adhesive composition according that described in Example 1 above was tested in a standard displacement test as described with respect to Examples 5-37, according to which a rectangular prism (hyper rectangle) having reference dimensions of 100 mm in length×10 mm in depth×10 mm in height was formed in a Cartesio W 3D printer application using FFF. The thermoplastic build materials tested were the polyamides Novamid® ID 1070 and Novamid® ID 1030. Various build surface temperatures were used, and the conventional adhesives Dimafix and 3D Lac were also tested for comparative purposes. Particular parameters of the 3D printing were as follows: 0.4 mm nozzle diameter; 0.48 mm extrusion width; 0.2 mm build material layer height; 50 mm/s print speed; 25% infill; no brim; build plate surface temperature=10° C. above $T_g$ of the adhesive composition acrylic polymer; ambient (build chamber) temperature=room temperature; liquefier temperature (according to print guidelines); wall layers=2, top layers=2, and bottom layers=2.

In these displacement/warpage tests, adhesives from a previous trial were removed by rinsing with water and drying with a paper towel after having first activated the remaining adhesive with ammonia. Next, to degrease the surface, ethanol was added to the glass plate after which it was allowed to evaporate. Then, an area on the glass build plate was marked with a waterproof marker to indicate at least an area encompassing the location where the reference objects were to be printed. For each adhesive reported herein, a total of 5 built objects were printed in the marked area, with displacement values (described further herein, below) recorded as an average of the 5 samples.

Next, a 7.5 ml quantity of adhesive was added to the build plate, using a pipette, and applied over the marked area with a moist brush. The build plate surface was then heated to 60° C. and maintained at this temperature for 5 minutes to evaporate solvent from the adhesive composition and thereby expedite its drying. The build plate surface was then heated to a temperature of approximately 10° C. above the glass transition temperature, $T_g$, of the polymer of the adhesive composition used in each case. This temperature was maintained for 30 minutes; following this period printing of the rectangular prism (hyper rectangle) was started. After printing of the reference object, the build plate surface was allowed to cool to room temperature.

Figure 3:
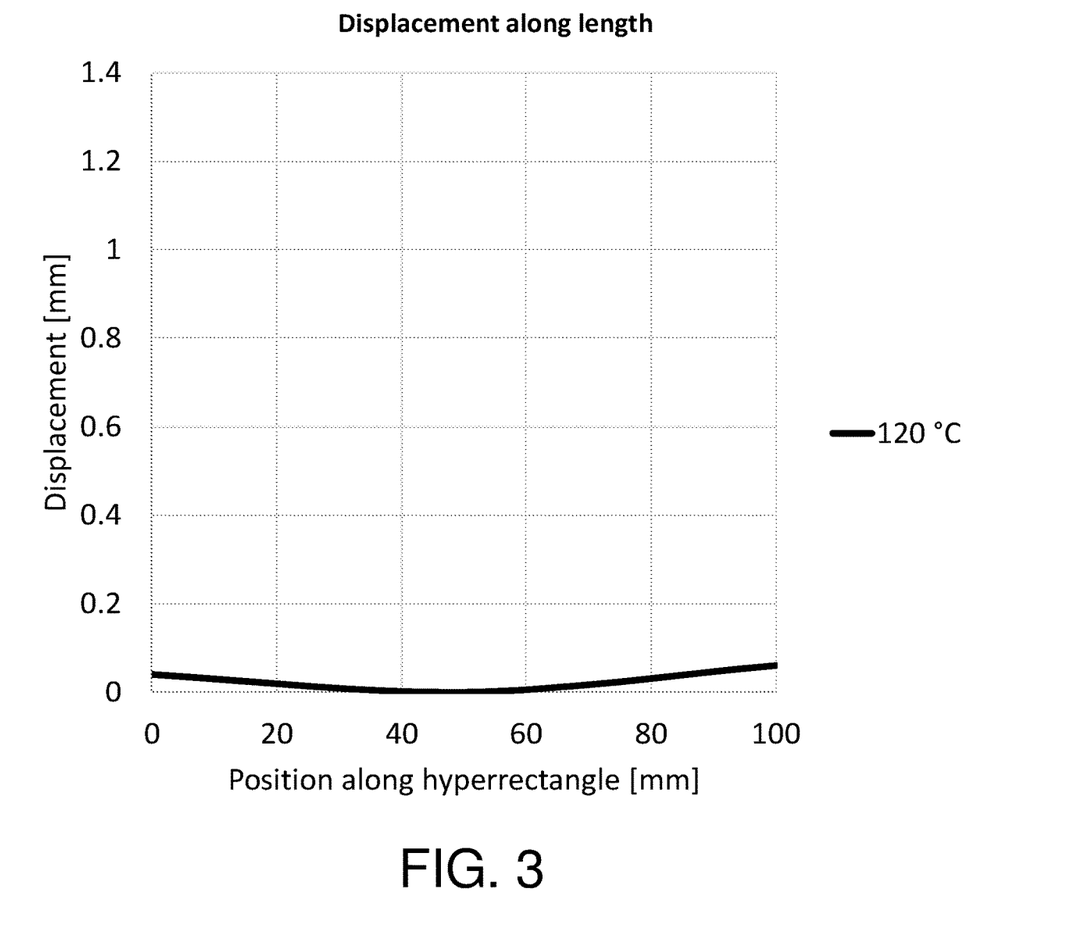
FIG. 3 depicts a graphical depiction of the displacement measurements for a sample with minimal displacement, per methods disclosed elsewhere herein.

Each built object was first evaluated visually to determine first whether a build failure had occurred. For purposes herein, a build is deemed to have failed if at least one of the 5 samples completely detached from the initial build surface, or if the desired unitary hyperrectangle shape was not formed by the printer due to detachment during the build process. Next, the warpage was evaluated by measuring the thickness of the built object at three locations along its length, including both ends (i.e. location 0 mm and at 100 mm) and in the middle (i.e. at 50 mm). The displacement was determined to be the difference between the "programmed" thickness of 10 mm (or "h" from FIG. 2B) and the actual measured value ($h_w$ from FIG. 2B). Measurements were taken by Mitutoyo Calipers. The displacement values for each sample were recorded in Microsoft Excel. A graphical depiction of the plotted displacement measurements for Example 38—a sample with minimal displacement—when fabricated using the polyamide build material Novamid® ID 1070 from DSM Engineering Plastics, and a build plate heated to 120° C., is shown in FIG. 3. The graph depicted utilizes the "scatter with smooth lines" chart in Excel for ease of visualization.

Also accompanying warpage was an observed detachment of at least one edge of the hyper rectangle, in tests in which the conventional adhesives were used (Comparative Examples 5-7). This is in contrast to the tests in which an adhesive composition according that described in Examples 1 above was used (Examples 38-41). The results are summarized in Table 3 below.

TABLE 3

Displacement/Warpage Tests, Adhesive of Example 1 vs. Conventional Adhesive

|  | Adhesive | Build Material | Build Plate, Temp | Max. Displacement (mm) |
| --- | --- | --- | --- | --- |
| Example 38 | Example 1 Composition | Novamid ® ID 1070 | 120° C. | ≈0.0 |
| Example 39 | Example 1 Composition | Novamid ® ID 1030 | 110° C. | 0.1 |
| Example 40 | Example 1 Composition | Novamid ® ID 1030 | 100° C. | 0.2 |
| Example 41 | Example 1 Composition | Novamid ® ID 1030 | 90° C. | 0.6 |
| Comp. Ex. 5 | Dimafix (conventional) | Novamid ® ID 1070 | 120° C. | FAIL |
| Comp. Ex. 6 | 3D Lac (conventional) | Novamid ® ID 1030 | 100° C. | FAIL |

These results demonstrated the superiority of compositions as described herein, in terms of promoting a desired level of adhesion in 3D printing applications, compared to compositions conventionally used for this purpose.

Overall, aspects of the invention relate to the use of acrylic polymers (such as acrylic emulsion copolymers) and compositions of these polymers having characteristics as described herein that improve adhesion, thereby providing particular advantages when applied in the art of additive manufacturing, such as 3D printing. Those having skill in the art, with the knowledge gained from the present disclosure, will recognize that various changes can be made to the disclosed acrylic polymers, compositions, methods for forming 3D objects, and additive manufacturing apparatuses (e.g., 3D printers) as described herein. As such, it should be understood that the features of the disclosure are susceptible to modifications and/or substitutions without departing from the scope of this disclosure. The specific embodiments illustrated and described herein are for illustrative purposes only, and not limiting of the invention as set forth in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

The invention claimed is:

1. An adhesive composition for additive manufacturing processes comprising an aqueous dispersion of an acrylic polymer, wherein:
   the aqueous dispersion has a solids content of from about 8 wt. % to about 20 wt. %,
   from about 40 wt. % to about 95 wt. % of the acrylic polymer is solubilized in a continuous aqueous phase in the aqueous dispersion, and
   the un-solubilized balance of the acrylic polymer is in the form of solid particles having an average particle diameter of from about 50 nm to about 500 nm which are dispersed in the continuous aqueous phase, wherein the acrylic polymer is an emulsion copolymer of:
(i) at least one C1-C16 alkyl methacrylate,
(ii) at least one C1-C16 alkyl acrylate, and
(iii) at least one unsaturated carboxylic acid,
wherein a C1-C16 alkyl radical of the C1-C16 alkyl methacrylate is optionally substituted with an amino moiety,
wherein the acrylic polymer has a glass transition temperature of from about 80° C. to about 130° C., and a number average molecular weight of from about 90 kilodaltons (kDa) to about 350 kDa, and
wherein the adhesive composition further comprises an alkalinizing agent such that a pH of the adhesive composition is at least about 8.0.

2. The adhesive composition of claim 1, wherein from about 40 wt. % to about 85% wt. % of the acrylic polymer is solubilized in the continuous aqueous phase.

3. The adhesive composition of claim 1, wherein the at least one unsaturated carboxylic acid comprises 2-carboxy ethyl acrylate.

4. The adhesive composition of claim 1, wherein the at least one C1-C16 alkyl methacrylate comprises ethyl methacrylate, methyl methacrylate, n-butyl methacrylate, dimethylaminoethyl methacrylate, or tert-butylaminoethyl methacrylate.

5. The adhesive composition of claim 1, wherein the at least one C1-C16 alkyl acrylate comprises ethyl acrylate, butyl acrylate, or tert-butyl acrylate.

6. The adhesive composition of claim 1, wherein the at least one unsaturated carboxylic acid comprises acrylic acid, methacrylic acid, 2-carboxy ethyl acrylate, crotonic acid, or itaconic acid.

7. The adhesive composition of claim 1, wherein (i), (ii), and (iii) are present, relative to each other, in weight ratios from about 50 to about 80 parts by weight of (i); from about 3 to about 20 parts by weight of (ii); and from about 8 to about 40 parts by weight of (iii).

8. The adhesive composition of claim 1, wherein the acrylic polymer is an emulsion copolymer of (i) n-butyl methacrylate, (ii) ethyl acrylate, and (iii) methacrylic acid.

9. The adhesive composition of claim 8, wherein the (i) n-butyl methacrylate, (ii) ethyl acrylate, and (iii) methacrylic acid are present in the acrylic polymer in weight ratios of about 60 to about 80 parts by weight of (i): about 5 to about 15 parts by weight of (ii): about 10 to about 30 parts by weight of (iii).

10. The adhesive composition of claim 9, wherein the pH of the adhesive composition is from about 8.0 to about 9.0.

11. The adhesive composition of claim 9, having a solids content from about 10 wt. % to about 15 wt. %.

12. An adhesive composition for promoting adhesion of 3D printing build materials,
the adhesive composition comprising an acrylic copolymer formed as the reaction product of at least butyl methacrylate, ethyl acrylate, and methacrylic acid,
wherein the acrylic copolymer has a glass transition temperature of from about 80° C. to about 130° C., and a number average molecular weight of from about 90 kilodaltons (kDa) to about 350 kDa,
wherein the adhesive composition is in the form of an emulsion having a continuous aqueous phase and solid particles of the acrylic copolymer dispersed therein,
wherein from about 40 wt. % to about 95 wt. % of the acrylic copolymer is solubilized in the continuous aqueous phase,
wherein the un-solubilized balance of the acrylic copolymer is the solid particles of the acrylic copolymer which have an average particle diameter of from about 50 nm to about 500 nm,
wherein the continuous aqueous phase has a pH of from about 8.0 to about 9.0; and
wherein the adhesive composition possesses a solids content of from about 8 wt. % to about 20 wt. %.

13. The adhesive composition of claim 12, wherein the adhesive composition possesses an acid value of from about 125 mgKOH/g to about 165 mgKOH/g.

14. A method of forming a three-dimensional object comprising the steps of:
a. applying an adhesive composition to at least a portion of a build surface, wherein the build surface is disposed within a printer bed;
b. heating the printer bed;
c. heating a thermoplastic build material to a flowable state;
d. selectively dispensing the thermoplastic build material in the flowable state onto at least a portion of the adhesive composition in accordance with computer data corresponding to at least a portion of the shape of the three-dimensional object to be formed, thereby forming a first build layer;
e. selectively dispensing the thermoplastic flowable build material onto at least a portion of the built build layer in accordance with computer data corresponding to at least an additional portion of the shape of the three-dimensional object to be formed, thereby forming an additional build layer;
f. repeating step e a sufficient number of times to build up the three-dimensional object;
wherein the adhesive composition is the adhesive composition of claim 1.

15. The method of claim 14, wherein the build surface, during the dispensing of the thermoplastic build material, has a temperature of from about 85° C. to about 150° C.

16. The method of claim 15, wherein the thermoplastic build material comprises or consists essentially of a semi-crystalline thermoplastic polymer.

17. The method of claim 15, wherein the thermoplastic build material comprises a polyamide (PA), a polyethylene, or a polypropylene polymer.

18. The method of claim 15, wherein the thermoplastic build material comprises a polyphenylene sulfide (PPS), a polyphenyl sulfone (PPSF), a high impact polystyrene ((HI)PS), polyethylene terephthalate (PET), a glycol-modified polyethylene terephthalate (PETG), a polyether imide (PEI), an acrylonitrile styrene acrylate (ASA), a polyvinyl alcohol (PVA), a polyether ether ketone (PEEK), an acrylonitrile butadiene styrene (ABS), a polylactic acid (PLA), a polycarbonate (PC), or a polybutadiene terephthalate (PBT).

19. The method of claim 15, wherein the dispensing of the initial first build layer and the one or more subsequent additional build layers is through a print head, wherein at least a two-dimensional (x-y) movement of the print head is controlled by a processor, having received data representative of the three-dimensional object.

20. The method of claim 15, wherein the adhesive composition reduces displacement of the thermoplastic build material, to below a threshold value of 4 mm, using a standard displacement test, according to which a baseline displacement without the adhesive composition is above the threshold value;
wherein the method is carried out under forming conditions of the standard displacement test, including a polyamide thermoplastic build material and a glass build plate providing the build surface.

* * * * *